US009614651B1

(12) United States Patent
Vivanco et al.

(10) Patent No.: US 9,614,651 B1
(45) Date of Patent: Apr. 4, 2017

(54) COORDINATING WIRELESS COMMUNICATION WITH ACCESS NODES

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 309 days.

(21) Appl. No.: 14/162,623

(22) Filed: Jan. 23, 2014

(51) Int. Cl.
*H04W 24/02* (2009.01)
*H04L 5/00* (2006.01)

(52) U.S. Cl.
CPC .......... *H04L 5/0032* (2013.01); *H04L 5/0035* (2013.01)

(58) Field of Classification Search
CPC .............................. H04L 5/0032; H04L 5/0035
See application file for complete search history.

(56) References Cited

U.S. PATENT DOCUMENTS

| 2012/0026896 A1* | 2/2012 | Li ........................ H04L 1/0003 370/248 |
| 2012/0082058 A1 | 4/2012 | Gerstenberger et al. |
| 2012/0188953 A1 | 7/2012 | Won et al. |
| 2013/0114523 A1 | 5/2013 | Chatterjee et al. |
| 2013/0301422 A1* | 11/2013 | Caretti ................. H04B 1/1027 370/241 |

FOREIGN PATENT DOCUMENTS

WO 2012/084035 A1 6/2012

OTHER PUBLICATIONS

R2-093727 'Impact of CoMP on Control Plane', 3GPP TSG RAN WG2 Meeting #66bis, Jun. 29-Jul. 3, 2009, pp. 1-5.*

* cited by examiner

*Primary Examiner* — Melvin Marcelo

(57) ABSTRACT

When a first throughput between the wireless device and a first access node meets a threshold, an application requirement of an application running on the wireless device is determined. Measurements are received of a first signal level of the communication link between the wireless device and the first access node and a second signal level of a signal from a second access node received at the wireless device. A first data rate is estimated using a first communication scheme between the wireless device and the first and second access nodes, and a second data rate is estimated using a second communication scheme between the wireless device and the first and second access nodes. One of the communication schemes is selected for use by the wireless device and the first and second access nodes based on the estimated first data rate and the estimated second data rate and the application requirement.

20 Claims, 7 Drawing Sheets

COORDINATING WIRELESS COMMUNICATION WITH ACCESS NODES

TECHNICAL BACKGROUND

In a wireless communication network, a wireless device at the edge of an access node coverage area can experience signal fading from a serving access node, which can degrade information throughput to and from the wireless device. The wireless device can also experience signal interference when frequencies are re-used by neighboring access nodes. Such inter-cell interference (ICI) may degrade data transmission near a coverage area edge, reducing data throughput and spectral efficiency to wireless devices near the coverage area edge. Issues of signal fading and interference can be particularly acute in a heterogeneous network (HetNet) environment comprising access nodes of varying signal power and geographic distribution.

OVERVIEW

In operation, it is determined that a first throughput over a communication link between a wireless device and a first access node meets a throughput threshold. An application requirement of an application running on the wireless device is determined. Measurements are received of a first signal level and a second signal level at the wireless device. The first signal level comprises a signal level of the communication link between the wireless device and the first access node, and the second signal level comprises a signal level of a signal level of a signal from a second access node. A first data rate is estimated using a first communication scheme between the wireless device and the first and second access nodes based on the first and second signal levels. Then, a second data rate is estimated using a second communication scheme between the wireless device and the first and second access nodes based on the first and second signal levels. Based on the estimated first data rate and the estimated second data rate and the application requirement, one of the first communication scheme and the second communication scheme is selected for use by the wireless device and the first and second access nodes.

DETAILED DESCRIPTION

Figure 1:
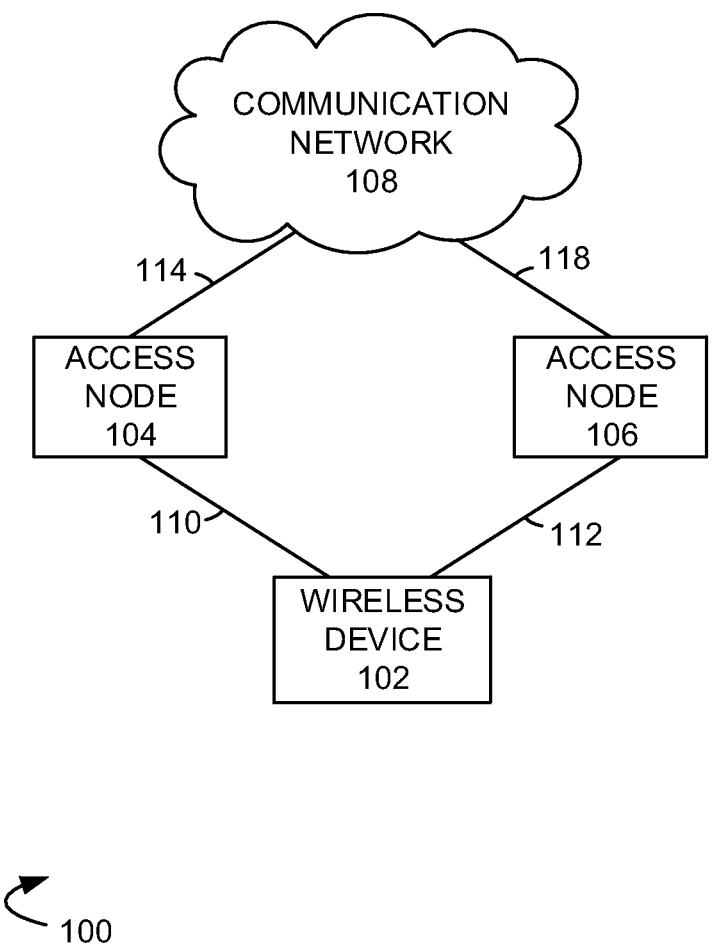
FIG. 1 illustrates an exemplary communication system to coordinate wireless communication with access nodes.

FIG. 1 illustrates an exemplary communication system 100 to coordinate wireless communication with access nodes comprising wireless device 102, access node 104, access node 106, and communication network 108. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication link 110, and with access node 106 over communication link 112.

Access nodes 104 and 106 are each a network node capable of providing wireless communications to wireless device 102, and can comprise, for example, a base transceiver station, a radio base station, an eNodeB device, or an enhanced eNodeB device. Access node 104 is in communication with communication network 108 over communication link 114, and access node 106 is in communication with communication network 108 over communication link 118. In an embodiment, access nodes 104 and 106 comprise neighboring access nodes of comparable coverage area and/or signal power, for example, two macro eNodeB towers, and the like. In an embodiment, access node 106 may comprise a coverage area at least a portion of which is within a coverage area of access node 104, for example, where access node 106 is a smaller access node than access node 104. For example, access node 104 can comprise a macro cell, and access node 106 can comprise a smaller cell such as a micro cell, pico cell, femto cell, and so forth. Other examples are also possible, including combinations of the foregoing.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, and 116 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 104, access node 106, and communication network 108 which are omitted for clarity, including additional processing nodes, routers, gateways, and physical and/or wireless data links for carrying data among the various network elements.

A wireless device at the edge of an access node coverage area can experience degraded wireless communications for several reasons. A signal level from a serving access node can fall off as the wireless device moves away from the serving access node, encounters an RF shadow created by topography or structures intervening between the wireless device and the serving access node, and the like. In addition, signal interference when frequencies are re-used by neighboring access nodes can degrade wireless communications with the wireless device.

The wireless device may be capable of communicating with two or more access nodes. For example, wireless device 102 may be able to establish communications with both access node 104 and access node 106. Further, communication system 100 can be configured to coordinate communication between wireless device 102, access node 104, and access node 106 to mitigate the effects of signal fading and/or signal interference.

In operation, it is determined that a first throughput over communication link 110 between wireless device 102 and first access node 104 meets a throughput threshold. An application requirement of an application running on wireless device 102 is determined. Measurements are received of a first signal level of communication link 110 between wireless device 102 and first access node 104, and of a second signal level of a signal from second access node 106 received at wireless device 102. Based on the first and second signal levels, an estimation is made of a first data rate which may be achieved using a first communication scheme between the wireless device and the first and second access nodes. Next, based on the first and second signal levels, an estimation is made of a second data rate which may be achieved using a second communication scheme between wireless device 102 and the first and second access nodes 104 and 106. The first and second communication schemes can comprise methods of coordinating communication between wireless device 102 and access nodes 104 and 106. Based on the estimated first data rate and the estimated second data rate and the application requirement, one of the first communication scheme and the second communication scheme is selected for use by the wireless device and the first and second access nodes.

Figure 2:
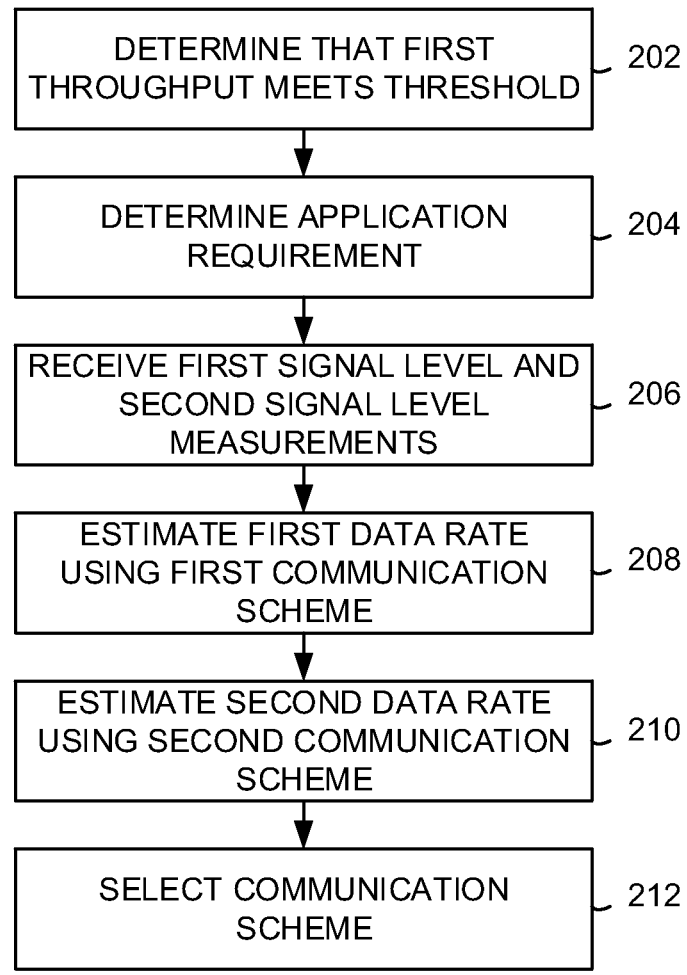
FIG. 2 illustrates an exemplary method of coordinating wireless communication with access nodes.

FIG. 2 illustrates an exemplary method of coordinating wireless communication with access nodes. In operation 202, it is determined that a first throughput over a communication link between the wireless device and a first access node meets a throughput threshold. For example, wireless device 102 can be in communication with access node 104 over communication link 110, and it may be determined that communication link 110 may be experiencing signal fading and/or signal interference tending to decrease a throughput between wireless device 102 and access node 104. In an embodiment, it can be determined that a data throughput over communication link 110 between wireless device 102 and access node 104 decreases to meet a throughput threshold.

When the first throughput meets the throughput threshold, an application requirement is determined of an application running on the wireless device (operation 204). The application requirement can comprise a minimum data rate, a maximum permitted data delay, a minimum throughput, a maximum error rate, a maximum data loss rate, and the like, of an application running on a wireless device. For example, a delay sensitive application, such as a streaming audio application, a streaming video application, a voice application (e.g., voice over internet protocol, voice over LTE, etc.), and the like, can comprise a relatively high required minimum data rate, a relatively low maximum permitted data delay, a relatively high minimum required throughput, a relatively low maximum permitted error rate, a relatively low maximum permitted data loss rate, and so forth. Conversely, a delay insensitive application, such as an email application, a messaging application, a web browsing application, and the like, can comprise a relatively low required minimum data rate, a relatively high maximum permitted data delay, a relatively high minimum required throughput, a relatively low maximum permitted error rate, a relatively low maximum permitted data loss rate, and the like.

Next, measurements are received of a first signal level of the communication link between the wireless device and the first access node and of a second signal level of a signal from a second access node received at the wireless device (operation 206). For example, one or more measurements can be made of a signal level of communication link 110 between wireless device 102 and access node 104, and one or more measurements can be made of a signal level of communication link 112 between wireless device 102 and access node 106. Each signal level can comprise a signal strength, a signal quality, or another signal level measurement, including combinations thereof. A signal strength can comprise a signal to noise ratio (SNR), a signal to interference ratio (SIR), a signal to interference plus noise ratio (SINR), a carrier to interference plus noise ratio (CINR), a received signal strength indicator (RSSI), a reference signal receive power (RSRP), and the like. A signal quality can comprise a channel quality indicator (CQI), a reference signal receive quality (RSRQ), and the like. The signal level measurements can be received at access node 104, access node 106, or another network element of communication system 100. Similarly, the signal level measurements can be received at a component of wireless device 102 from another component of wireless device 102.

A first data rate is then estimated using a first communication scheme between the wireless device and the first and second access nodes based on the first and second signal levels (operation 208). For example, based on the signal level measurements of first and second communication links 110 and 112, an estimation can be made of a first data rate which may be achieved using the first communication scheme. The first communication scheme can comprise a first method of coordinating communication between wireless device 102, access node 104 and access node 106. The first method of coordinating communication can comprise transmitting data from wireless device 102 to both access node 104 and to access node 106. The data received by access nodes 104 and 106 can be combined and processed to produce a combined output signal comprises the data transmitted from wireless device 102. The combined output signal can then be sent from one of access node 104 and access node 106 to communication network 108 over communication link 114 or 118, respectively. Combining the data received from access nodes 104 and 106 permits the reduction of errors from data signals that are relatively low in strength, or masked by interference.

In operation, data received by one access node can be transferred to the other access node (e.g., from access node 104 to access node 106, or vice versa) for combination into the combined output signal. The transfer of data from the wireless device from one access node to the other access node can increase a load or utilization of communication resources in a backhaul, such as between the first and second access nodes, as well as potentially between the access nodes and other intermediate network elements. An example of the first communication scheme can comprise Joint Reception and Processing according to the Coordinated-Multipoint (CoMP) feature of the LTE-Advanced radio access technology. Other examples are also possible.

Then, a second data rate is estimated using a second communication scheme between the wireless device and the first and second access nodes based on the first and second signal levels (operation 210). For example, based on the signal level measurements of first and second communication links 110 and 112, an estimation can be made of a second data rate which may be achieved using the second communication scheme. The second communication scheme can comprise a second method of coordinating communication between wireless device 102, access node 104 and access node 106. The second method of coordinating communication can comprise coordinating the scheduling of transmission of data from wireless device 102 among access nodes 104 and 106 to minimize interference. For example, wireless device 102 can be instructed to transmit data first to access node 104, and then to access node 106. Each of access nodes 104 and 106 then send data which each receives from wireless device 102 to communication network 108 over communication links 114 and 116, respectively. Coordinating the scheduling of data reception by each of access nodes 104 and 106 may tend to reduce a load or utilization of communication resources in a backhaul, such as between the first and second access nodes, as well as potentially between the access nodes and other intermediate network elements. However, compared with the first communication scheme, the second communication scheme may provide the data from wireless device 102 to communication network 108 at a lower data rate. An example of the second communication scheme can comprise Coordinated Scheduling according to the Coordinated-Multipoint (CoMP) feature of the LTE-Advanced radio access technology. Other examples are also possible.

Based on the estimated first data rate and the estimated second data rate and the application requirement, one of the first communication scheme and the second communication scheme is selected for use by the wireless device and the first and second access nodes (operation 212). For example, when an application running on wireless device 102 comprises a delay sensitive application, such as a streaming audio application, a streaming video application, a voice application, and the like, the first communication scheme may be selected, to satisfy the relatively high required minimum data rate, or relatively low maximum permitted data delay, or relatively high minimum required throughput, or relatively low maximum permitted error rate, or relatively low maximum permitted data loss rate, and so forth, of the application. Conversely, when an application running on wireless device 102 comprises a delay insensitive application, such as an email application, a messaging application, a web browsing application, and the like, the second communication scheme may be selected, based on the relatively low required minimum data rate, relatively high maximum permitted data delay, relatively high minimum required throughput, relatively low maximum permitted error rate, relatively low maximum permitted data loss rate, and so forth, of the application. In an embodiment, the selected communication scheme is used in an uplink portion of the communication link between the wireless device and the first access node and an uplink portion of the second communication link between the wireless device and the second access node.

Figure 3:
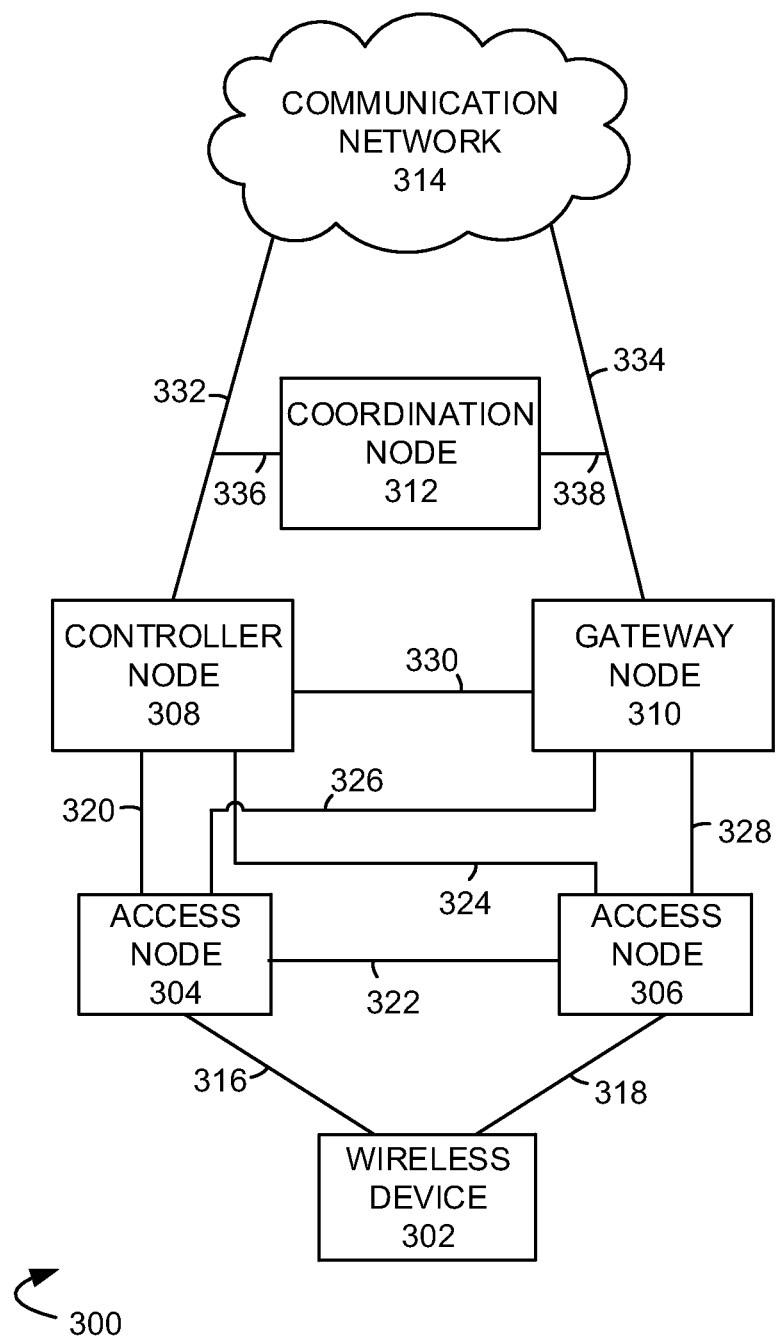
FIG. 3 illustrates another exemplary communication system to coordinate wireless communication with access nodes.

FIG. 3 illustrates another exemplary communication system 300 to coordinate wireless communication with access nodes comprising wireless device 302, access node 304, access node 306, controller node 308, gateway node 310, coordination node 312, and communication network 314. Examples of wireless device 302 can comprise a cell phone, a smart phone, a computing platform such as a laptop, palmtop, or tablet, a personal digital assistant, or an internet access device, including combinations thereof. Wireless device 302 can communicate with access node 304 over communication link 316, and with access node 306 over communication link 318.

Access nodes 304 and 306 are each a network node capable of providing wireless communications to wireless device 302, and can be, for example, a base transceiver station, a radio base station, an eNodeB device, or an enhanced eNodeB device. Access node 304 is in communication with controller node 308 over communication link 320 and with gateway node 310 over communication link 326. Access node 306 is in communication with controller node 308 over communication link 324 and with gateway node 310 over communication link 328. Access nodes 304 and 306 can also communicate with each other over communication link 322. In an embodiment, access nodes 304 and 306 comprise neighboring access nodes of comparable coverage area and/or signal power, for example, two macro eNodeB towers and the like. In an embodiment, access node 306 may comprise a coverage area at least a portion of which is within a coverage area of access node 304, for example, where access node 306 is a smaller access node than access node 304. For example, access node 304 can comprise a macro cell, and access node 306 can comprise a smaller cell such as a micro cell, pico cell, femto cell, and so forth. Other examples are also possible, including combinations of the foregoing.

Controller node 308 can comprise a processor and associated circuitry to execute or direct the execution of computer-readable instructions, and can be configured to control the setup and maintenance of a communication session over communication network 314 for wireless device 302. Controller node 308 can comprise a mobile switching center (MSC), a dispatch call controller (DCC), a mobility management entity (MME), or another similar network node. Controller node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 308 can receive instructions and other input at a user interface. Controller node 308 is in communication with communication network 314 over communication link 322, and with gateway node 310 over communication link 330.

Gateway node 310 can comprise a processor and associated circuitry to execute or direct the execution of computer-readable instructions, and can be configured to receive data of wireless device 302 which is sent from one or more of access nodes 304 and 306, and to send the received data of wireless device 302 to communication network 314. Gateway node 310 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 310 can receive instructions and other input at a user interface. Examples of gateway node 310 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 310 is in communication with communication network 314 over communication link 334.

Coordination node 312 is a network element which can comprise a processor and associated circuitry to execute or direct the execution of computer-readable instructions, and which can be configured to coordinate wireless communication with access nodes 304 and 306. Coordination node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Coordination node 312 can, among other things, perform deep packet inspection of packets sent from and/or to wireless device 302. Deep packet inspection generally involves an inspection of packets beyond Open Systems Interconnection (OSI) layer 2 including an inspection of the data portion (also referred to as the payload portion) of a packet (and possibly also the header of a packet). That is, deep packet inspection can involve an examination of any of layers 2 through 7 of the OSI model. The data portion of a packet remains distinct from a header portion, even where the packet receives additional header information (such as by packet encapsulation or a similar process). In other words, when a packet is encapsulated, any additional header information does not combine information from the data portion with any header portion. Coordination node 312 can be for example, a standalone computing device or network element, or the functionality of coordination node 312 can be included in another network element, such as a mobility management entity (MME), a gateway, a proxy node, or another network element. Among other things, coordination node 312 can determine application requirements of an application running on wireless device 302, as well as routing requirements and scheduling requirements of data sent from wireless device 302, and the like, by performing deep packet inspection on data packets sent from wireless device 302. Coordination node 312 can communicate with controller node 308 over communication link 336, and with gateway node 310 over communication link 338.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 can be capable of carrying voice information and other data, for example, to support communications by a wireless device such as wireless device 302. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 314 may also comprise a wireless network, including base stations, wireless communication nodes, telephony switches, internet routers, network gateways, computer systems, communication links, or some other type of communication equipment, and combinations thereof.

Communication links 316, 318, 320, 322, 324, 326, 328, 330, 332, 334, 336, and 338 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 304, access node 306, controller node 308, gateway node 310, coordination node 312, and communication network 314 which are omitted for clarity, including additional processing nodes, routers, gateways, and physical and/or wireless data links for carrying data among the various network elements.

Figure 4:
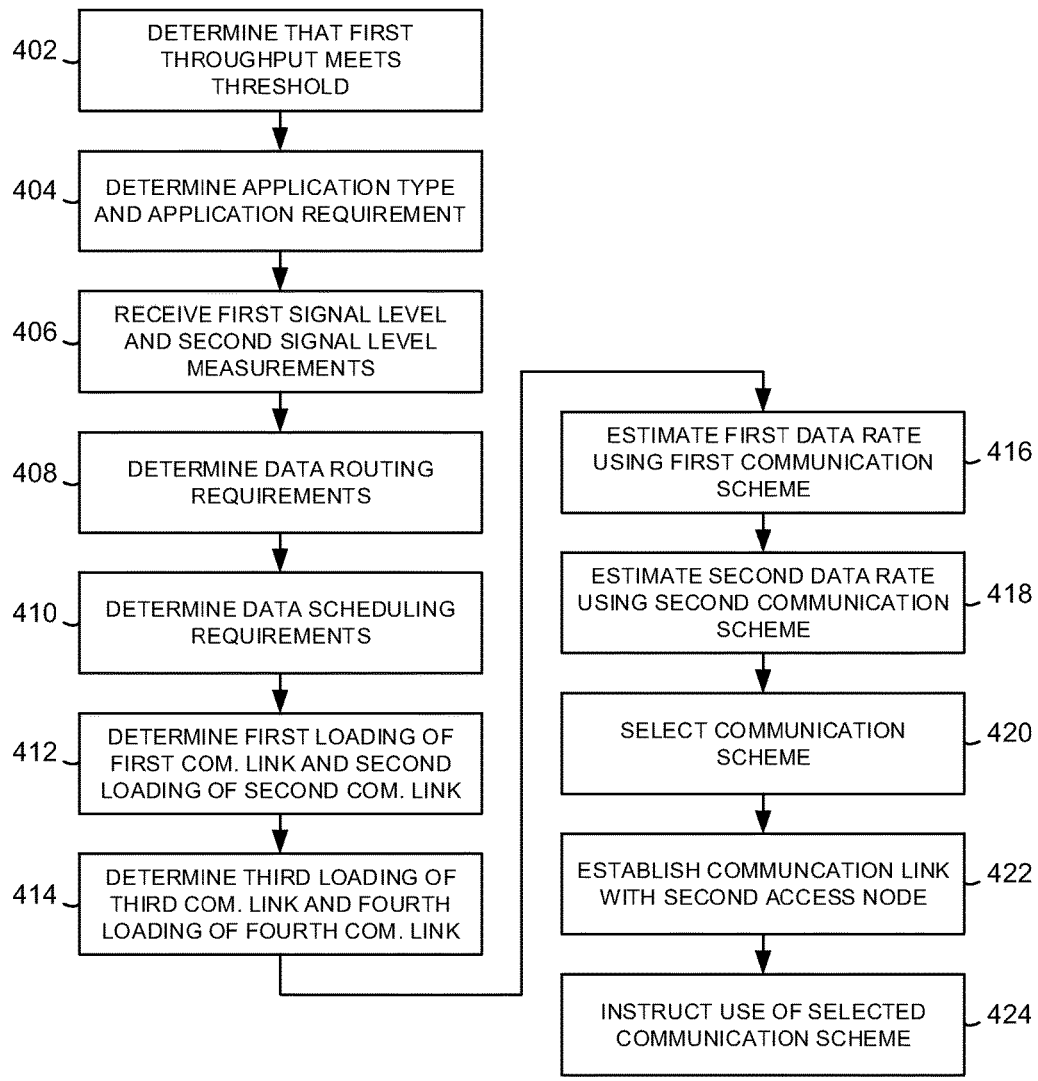
FIG. 4 illustrates another exemplary method of method of coordinating wireless communication with access nodes.

FIG. 4 illustrates another exemplary method of coordinating wireless communication with access nodes. In operation 402, it is determined that a first throughput over a communication link between the wireless device and a first access node meets a throughput threshold. For example, wireless device 302 can be in communication with access node 304 over communication link 316, and it may be determined that communication link 316 may be experiencing signal fading and/or signal interference tending to decrease a throughput between wireless device 302 and access node 304. In an embodiment, it can be determined that a data throughput over communication link 316 between wireless device 302 and access node 304 decreases to meet a throughput threshold.

When the first throughput meets the throughput threshold, an application requirement and an application type is determined of an application running on the wireless device (operation 404). The application type can comprise a specific type of application, such as a streaming audio application, a streaming video application, a voice application (e.g., voice over internet protocol, voice over LTE, etc.), an email application, a messaging application, a web browsing application, and the like. A specific type of application may be given greater or lesser priority for a first communication scheme or a second communication scheme. For example, a streaming audio application, a streaming video application, or a voice application may be given priority for a communication scheme which may provide a higher data rate, and an email application, a messaging application, or a web browsing application may be given higher priority for a communication scheme which provides a lower data rate than the first communication scheme.

The application requirement can comprise a minimum data rate, a maximum permitted data delay, a minimum throughput, a maximum error rate, a maximum data loss rate, and the like, of an application running on a wireless device. For example, a delay sensitive application, such as a streaming audio application, a streaming video application, a voice application (e.g., voice over internet protocol, voice over LTE, etc.), and the like, can comprise a relatively high required minimum data rate, a relatively low maximum permitted data delay, a relatively high minimum required throughput, a relatively low maximum permitted error rate, a relatively low maximum permitted data loss rate, and so forth. Conversely, a delay insensitive application, such as an email application, a messaging application, a web browsing application, and the like, can comprise a relatively low required minimum data rate, a relatively high maximum permitted data delay, a relatively high minimum required throughput, a relatively low maximum permitted error rate, a relatively low maximum permitted data loss rate, and the like.

Then, measurements are received of a first signal level of the communication link between the wireless device and the first access node and a second signal level of a signal from a second access node received at the wireless device (operation 406). For example, one or more measurements can be made of a signal level of communication link 316 between wireless device 302 and access node 304, and one or more measurements can be made of a signal level of communication link 318 between wireless device 302 and access node 306. Each signal level can comprise a signal strength, a signal quality, or another signal level measurement, including combinations thereof. A signal strength can comprise a signal to noise ratio (SNR), a signal to interference ratio (SIR), a signal to interference plus noise ratio (SINR), a carrier to interference plus noise ratio (CINR), a received signal strength indicator (RSSI), a reference signal receive power (RSRP), and the like. A signal quality can comprise a channel quality indicator (CQI), a reference signal receive quality (RSRQ), and the like. The signal level measurements can be received at access node 304, access node 306, or another network element of communication system 300, such as controller node 308, gateway node 310, or coordination node 312. Similarly, the signal level measurements can be received at a component of wireless device 302 from another component of wireless device 302.

Data routing requirements of data sent by the application to the first access node are then determined (operation 408). For example, it can be determined by coordination node 312 that data sent by the application to the first access node is associated with a traffic class indicator, such as a quality of service class indicator (QCI) or similar traffic class indicator. Based on the traffic class indicator, the data may be associated with a greater or lesser routing priority within communication system 300. The determined routing requirements may be used to estimate a first data rate and a second data rate.

Next, data scheduling requirements of data sent by the application to the first access node are then determined (operation 410). For example, it can be determined by coordination node 312 that data sent by the application to the first access node is associated with a scheduling priority indicator, such as guaranteed bit rate (GBR), non-guaranteed bit rate (nGBR), and the like. Based on the traffic class indicator, the data may be associated with a greater or lesser scheduling priority between access node 304 and wireless device 302, and between access node 306 and wireless device 302. The determined scheduling requirements may be used to estimate a first data rate and a second data rate.

Then, in operation 412, a first loading of the communication link between the wireless device and the first access node and a second loading of a second communication link between the wireless device and the second access node can be determined. The first loading and the second loading can comprise, for example, a utilization or requested utilization of communication link resources, an amount of data that is or may be sent to or from the wireless device over each communication link, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. The second loading can be determined of a possible frequency band selected for communication between wireless device 302 and access node 306. A loading of a communication link between the wireless device and an access node can comprise an average loading (actual or estimated) during a time period, an aggregate loading (actual or estimated) during a time period, a number of times that a loading (actual or estimated) meets a loading threshold during a time period, and so forth. The determined first and second loadings may be used to estimate the first data rate and the second data rate.

Next, a third loading of a backhaul communication link of the first access node, and a fourth loading of a backhaul communication link of the second access node, can be determined (operation 414). A loading of a backhaul communication link can comprise an average loading during a time period, an aggregate loading during a time period, a number of times that a loading meets a loading threshold during a time period, and so forth. Examples of the third loading can comprise a loading of communication link 320 between access node 304 and controller node 308, or of communication link 326 between access node 304 and gateway node 310. Another example of the third loading can comprise a loading of communication link 114 between access node 104 and communication network 108 (FIG. 1). Returning to FIG. 3, examples of the fourth loading can comprise a loading of communication link 324 between access node 306 and controller node 308, or a loading of communication link 328 between access node 306 and gateway node 310. Another example of the fourth loading can comprise a loading of communication link 118 between access node 106 and communication network 108 (FIG. 1). Other loadings of backhaul communication links can also be determined, including combinations of the foregoing. A loading of a backhaul communication link can comprise a utilization or requested utilization of communication link resources, an amount of data that is or may be sent to or from the wireless device over each communication link, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. The determined third and fourth loadings may be used to estimate the first data rate and the second data rate.

Referring again to FIG. 4, a first data rate is estimated using a first communication scheme between the wireless device and the first and second access nodes based on the first and second signal levels (operation 416). For example, based on the signal level measurements of first and second communication links 316 and 318, an estimation can be made of a first data rate which may be achieved using the first communication scheme. The first data rate can further be estimated using at least one of the data routing requirements, the data scheduling requirements, the first loading and the second loading, and the third loading and the fourth loading. The first communication scheme can comprise a first method of coordinating communication between wireless device 302, access node 304 and access node 306. The first method of coordinating communication can comprise transmitting data from wireless device 302 to both access node 304 and to access node 306. The data received by access nodes 304 and 306 can be combined and processed to produce a combined output signal comprises the data transmitted from wireless device 302. The combined output signal can then be sent from one of access node 304 and access node 306 to gateway node 310 over communication link 326 or 328, respectively, and from gateway node 310 to communication network 314. Combining the data received from access nodes 304 and 306 enables the reduction of errors from data signals that are relatively low in strength, or masked by interference.

In operation, data received by one access node can be transferred to the other access node (e.g., from access node 304 to access node 306, or vice versa, over communication link 322) for combination into the combined output signal. The transfer of data from the wireless device from one access node to the other access node can increase a load or utilization of communication resources in a backhaul, such as between the first and second access nodes, as well as potentially between the access nodes and other intermediate network elements. An example of the first communication scheme can comprise Joint Reception and Processing according to the Coordinated-Multipoint (CoMP) feature of the LTE-Advanced radio access technology. Other examples are also possible. In an embodiment, the first data rate can further be estimated using the first communication scheme, the data routing requirements, the data scheduling requirements, the first loading and the second loading, and the third loading and the fourth loading.

Then, a second data rate is estimated using a second communication scheme between the wireless device and the first and second access nodes based on the first and second signal levels (operation 418). For example, based on the signal level measurements of first and second communication links 316 and 318, an estimation can be made of a second data rate which may be achieved using the second communication scheme. The second data rate can further be estimated using at least one of the data routing requirements, the data scheduling requirements, the first loading and the second loading, and the third loading and the fourth loading. The second communication scheme can comprise a second method of coordinating communication between wireless device 302, access node 304 and access node 306. The second method of coordinating communication can comprise coordinating the scheduling of transmission of data from wireless device 302 among access nodes 304 and 306 to minimize interference. For example, wireless device 302 can be instructed to transmit data first to access node 304, and then to access node 306. Each of access nodes 304 and 306 then send data which each receives from wireless device 302 to gateway node 310 over communication links 326 and 328, respectively, and gateway node 310 then sends the data from wireless device 302 to communication network 314. Coordinating the scheduling of data reception by each of access nodes 304 and 306 tends to reduce a load or utilization of communication resources in a backhaul, such as between the first and second access nodes, as well as potentially between the access nodes and other intermediate network elements. However, compared with the first communication scheme, the second communication scheme may provide the data from wireless device 302 to communication network 308 at a lower data rate. An example of the second communication scheme can comprise Coordinated Scheduling according to the Coordinated-Multipoint (CoMP) feature of the LTE-Advanced radio access technology. Other examples are also possible. In an embodiment, the second data rate can further be estimated using the second communication scheme, the data routing requirements, the data scheduling requirements, the first loading and the second loading, and the third loading and the fourth loading.

Based on the estimated first data rate and the estimated second data rate and the application requirement, one of the first communication scheme and the second communication scheme is selected for use by the wireless device and the first and second access nodes (operation 420). For example, when an application running on wireless device 302 comprises a delay sensitive application, such as a streaming audio application, a streaming video application, a voice application, and the like, the first communication scheme may be selected, to satisfy the relatively high required minimum data rate, or relatively low maximum permitted data delay, or relatively high minimum required throughput, or relatively low maximum permitted error rate, or relatively low maximum permitted data loss rate, and so forth, of the application. Conversely, when an application running on wireless device 302 comprises a delay insensitive application, such as an email application, a messaging application, a web browsing application, and the like, the second communication scheme may be selected, based on the relatively low required minimum data rate, relatively high maximum permitted data delay, relatively high minimum required throughput, relatively low maximum permitted error rate, relatively low maximum permitted data loss rate, and so forth, of the application.

When the communication scheme is selected, a communication link is established between the wireless device and the second access node (operation 422), and the wireless device, the first access node, and the second access node are instructed to use the selected communication scheme (operation 424). For example, communication link 306 can be established between wireless device 302 and access node 306. Establishing the communication link can comprise reserving communication resources of communication link 318 to wireless device 302, allocating one or more frequency bands to wireless device 302, and the like. The instruction to use the selected communication scheme can be sent by coordination node 312, controller node 308, or gateway node 310. Similarly, the instruction to use the selected communication scheme can be sent by access node 304 and/or access node 306. In an embodiment, the selected communication scheme is used in an uplink portion of communication link 316 between wireless device 302 and access node 304, and in an uplink portion of communication link 318 between 302 wireless device and access node 306.

Figure 5:
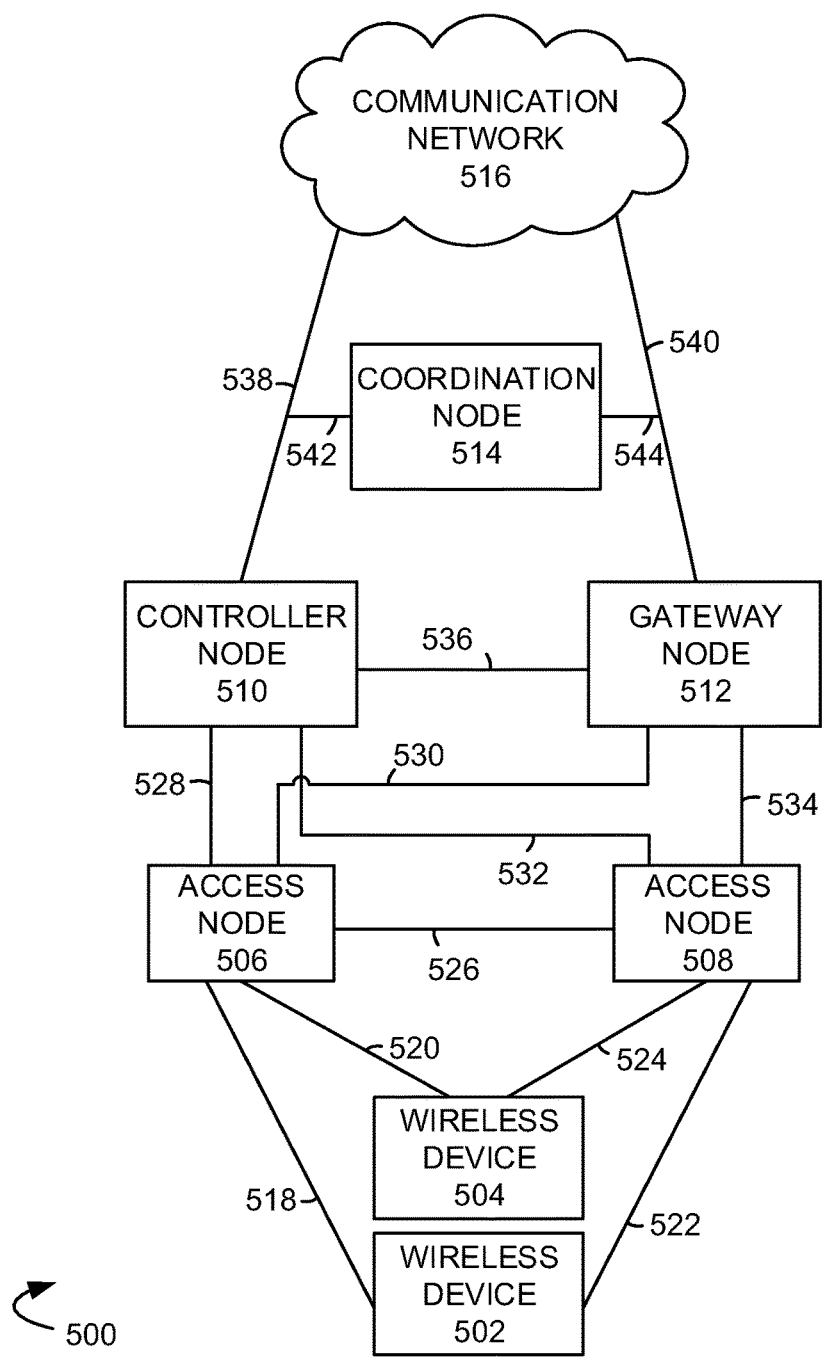
FIG. 5 illustrates another exemplary communication system to coordinate wireless communication with access nodes.

FIG. 5 illustrates another exemplary communication system 500 to coordinate wireless communication with access nodes comprising wireless devices 502 and 504, access nodes 506 and 508, controller node 510, gateway node 512, coordination node 514, and communication network 516. Examples of wireless devices 502 and 504 can comprise a cell phone, a smart phone, a computing platform such as a laptop, palmtop, or tablet, a personal digital assistant, or an internet access device, including combinations thereof. Wireless device 502 can communicate with access node 506 over communication link 518, and with access node 508 over communication link 522. Wireless device 504 can communicate with access node 506 over communication link 520, and with access node 508 over communication link 524.

Access nodes 506 and 508 are each a network node capable of providing wireless communications to wireless devices 502 and 504, and can be, for example, a base transceiver station, a radio base station, an eNodeB device, or an enhanced eNodeB device. Access node 506 is in communication with controller node 510 over communication link 528 and with gateway node 512 over communication link 530. Access node 508 is in communication with controller node 510 over communication link 532 and with gateway node 512 over communication link 534. Access nodes 506 and 508 can also communicate with each other over communication link 526. In an embodiment, access nodes 506 and 508 comprise neighboring access nodes of comparable coverage area and/or signal power, for example, two macro eNodeB towers and the like. In an embodiment, access node 508 may comprise a coverage area at least a portion of which is within a coverage area of access node 506, for example, where access node 508 is a smaller access node than access node 506. For example, access node 506 can comprise a macro cell, and access node 508 can comprise a smaller cell such as a micro cell, pico cell, femto cell, and so forth. Other examples are also possible, including combinations of the foregoing.

Controller node 510 can comprise a processor and associated circuitry to execute or direct the execution of computer-readable instructions, and can be configured to control the setup and maintenance of a communication session over communication network 516 for wireless devices 502 and 504. Controller node 510 can comprise a mobile switching center (MSC), a dispatch call controller (DCC), a mobility management entity (MME), or another similar network node. Controller node 510 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 510 can receive instructions and other input at a user interface. Controller node 510 is in communication with communication network 516 over communication link 538 and with gateway node 512 over communication link 536.

Gateway node 512 can comprise a processor and associated circuitry to execute or direct the execution of computer-readable instructions, and can be configured to receive data of wireless devices 502 and 504 which is sent from one or more of access nodes 506 and 508, and to send the received data of wireless devices 502 and 504 to communication network 516. Gateway node 512 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 512 can receive instructions and other input at a user interface. Examples of gateway node 512 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 512 is in communication with communication network 516 over communication link 540.

Coordination node 514 is a network element which can comprise a processor and associated circuitry to execute or direct the execution of computer-readable instructions, and which can be configured to coordinate wireless communication with access nodes 506 and 508. Coordination node 514 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Coordination node 514 can, among other things, perform deep packet inspection of packets sent from and/or to wireless devices 502 and 504. Deep packet inspection generally involves an inspection of packets beyond Open Systems Interconnection (OSI) layer 2 including an inspection of the data portion (also referred to as the payload portion) of a packet (and possibly also the header of a packet). That is, deep packet inspection can involve an examination of any of layers 2 through 7 of the OSI model. The data portion of a packet remains distinct from a header portion, even where the packet receives additional header information (such as by packet encapsulation or a similar process). In other words, when a packet is encapsulated, any additional header information does not combine information from the data portion with any header portion. Coordination node 514 can be for example, a standalone computing device or network element, or the functionality of coordination node 514 can be included controller node 510 or gateway node 512, or in another network element, such as a mobility management entity (MME), a gateway, a proxy node, or another network element. Among other things, coordination node 514 can determine application requirements of an application running on wireless devices 502 and 504, as well as routing requirements and scheduling requirements of data sent from wireless devices 502 and 504, and so forth, by performing deep packet inspection on data packets sent from wireless devices 502 and 504. Coordination node 514 can communicate with controller node 510 over communication link 542, and with gateway node 512 over communication link 544.

Communication network 516 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 516 can be capable of carrying voice information and other data, for example, to support communications by a wireless device such as wireless devices 502 and 504. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 516 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 516 may also comprise a wireless network, including base stations, wireless communication nodes, telephony switches, internet routers, network gateways, computer systems, communication links, or some other type of communication equipment, and combinations thereof.

Communication links 518, 520, 522, 524, 526, 528, 530, 532, 534, 536, 538, 540, and 542 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 500 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 506, access node 508, controller node 510, gateway node 512, coordination node 514, and communication network 516 which are omitted for clarity, including additional processing nodes, routers, gateways, and physical and/or wireless data links for carrying data among the various network elements.

Figure 6:
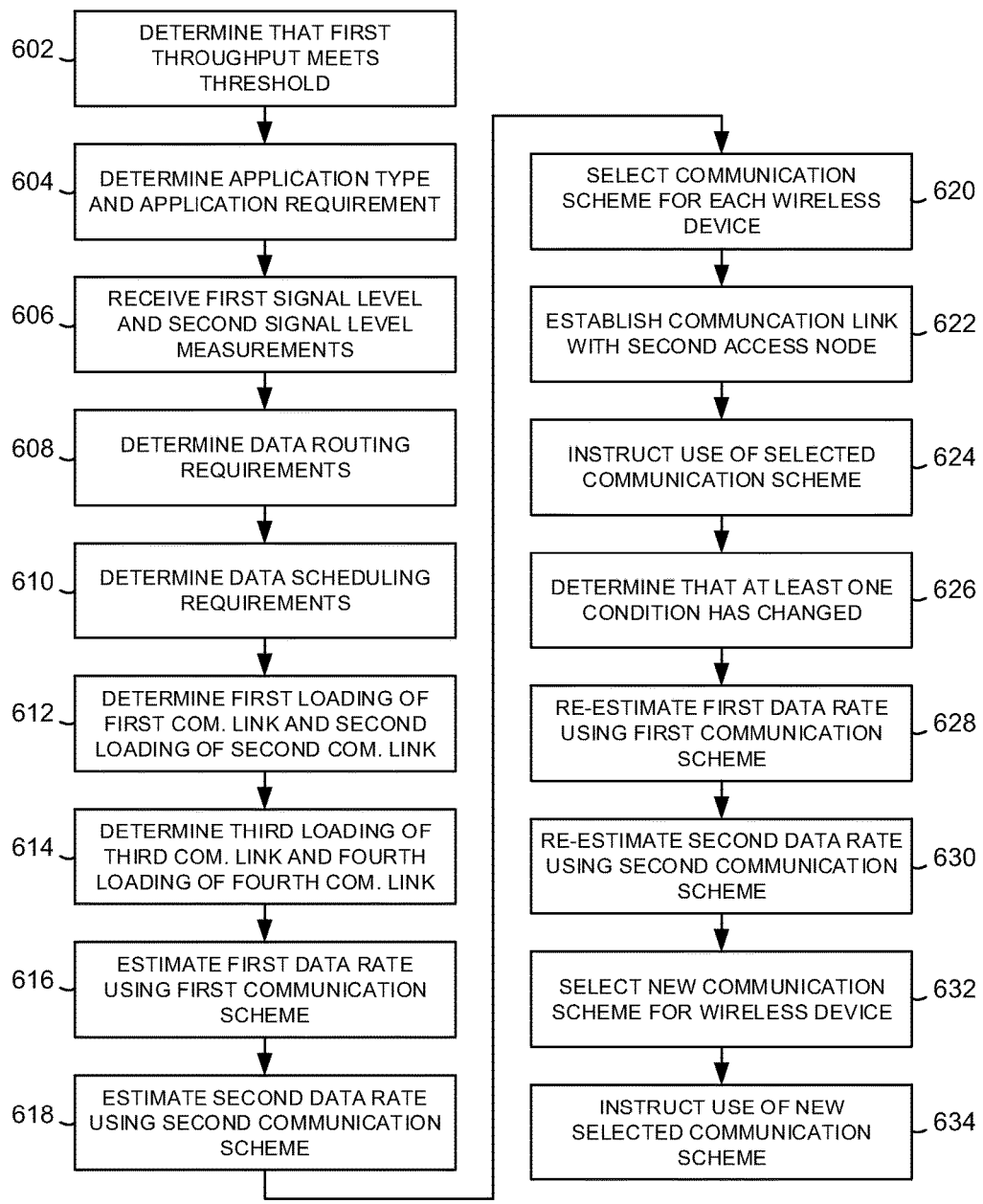
FIG. 6 illustrates another exemplary method of method of coordinating wireless communication with access nodes.

FIG. 6 illustrates another exemplary method of coordinating wireless communication with access nodes. In operation 602, it is determined that a first throughput over communication links between each wireless device and a first access node meets a throughput threshold. For example, wireless devices 502 and 504 can be in communication with access node 506 over communication links 518 and 520, respectively, and it may be determined that communication links 518 and 520 may be experiencing signal fading and/or signal interference tending to decrease a throughput over communication links 518 and 520. In an embodiment, it can be determined that a data throughput over communication link 518 and/or 520 decreases to meet a throughput threshold.

Although both wireless devices 502 and 504 are described above as being in communication with access node 506 in operation 602, either or both of wireless devices 502 and 504 can initially be in communication with access node 508. So long as each wireless device is capable of ultimately establishing communications with both access nodes 506 and 508, the wireless devices may initially be in communication with either access node. Thus, while access node 506 may be referred to below as a first access node and access node 508 as a second access node, either access node may function as the first or second access node for either of the wireless devices. For example, wireless device 502 may initially be in communication with access node 506, and wireless device 504 may initially be in communication with access node 508 (and vice versa). Further, the first throughput described above can refer to a throughput over the communication link between each wireless device and the access node with which it is in initial communication.

When the first throughput meets the throughput threshold, an application requirement and an application type is determined of an application running on each wireless device (operation 604). The application type can comprise a specific type of application, such as a streaming audio application, a streaming video application, a voice application (e.g., voice over internet protocol, voice over LTE, etc.), an email application, a messaging application, a web browsing application, and the like. A specific type of application may be given greater or lesser priority for a first communication scheme or a second communication scheme. For example, a streaming audio application, a streaming video application, or a voice application may be given priority for a communication scheme which may provide a higher data rate, and an email application, a messaging application, or a web browsing application may be given higher priority for a communication scheme which provides a lower data rate than the first communication scheme.

The application requirement can comprise a minimum data rate, a maximum permitted data delay, a minimum throughput, a maximum error rate, a maximum data loss rate, and the like, of an application running on a wireless device. For example, a delay sensitive application, such as a streaming audio application, a streaming video application, a voice application (e.g., voice over internet protocol, voice over LTE, etc.), and the like, can comprise a relatively high required minimum data rate, a relatively low maximum permitted data delay, a relatively high minimum required throughput, a relatively low maximum permitted error rate, a relatively low maximum permitted data loss rate, and the like. Conversely, a delay insensitive application, such as an email application, a messaging application, a web browsing application, and the like, can comprise a relatively low required minimum data rate, a relatively high maximum permitted data delay, a relatively high minimum required throughput, a relatively low maximum permitted error rate, a relatively low maximum permitted data loss rate, and so forth.

Then, measurements are received of a first signal level of the communication link between each wireless device and the first access node and a second signal level of a signal from a second access node received at each wireless device (operation 606). For example, one or more measurements can be made of a signal level of communication link 518 between wireless device 502 and access node 506, and one or more measurements can be made of a signal level of communication link 522 between wireless device 502 and access node 504. Similarly, one or more measurements can be made of communication links 520 and 524 for wireless device 504 with respect to access nodes 506 and 508. Each signal level can comprise a signal strength, a signal quality, or another signal level measurement, including combinations thereof. A signal strength can comprise a signal to noise ratio (SNR), a signal to interference ratio (SIR), a signal to interference plus noise ratio (SINR), a carrier to interference plus noise ratio (CINR), a received signal strength indicator (RSSI), a reference signal receive power (RSRP), and the like. A signal quality can comprise a channel quality indicator (CQI), a reference signal receive quality (RSRQ), and the like. The signal level measurements can be received at access node 506, access node 508, or another network element of communication system 500, such as controller node 510, gateway node 512, or coordination node 514. The signal level measurements related to wireless device 502 can be also received at a component of wireless device 502 from another component of wireless device 502. Similarly, the signal level measurements related to wireless device 504 can be also received at a component of wireless device 504 from another component of wireless device 504.

Data routing requirements of data sent by each application to the first access node are then determined (operation 608). For example, it can be determined by coordination node 514 that data sent by each application to the first access node is associated with a traffic class indicator, such as a quality of service class indicator (QCI) or similar traffic class indicator. Based on the traffic class indicator, the data may be given a greater or less routing priority within communication system 500. The determined routing requirements may be used to estimate a first data rate and a second data rate.

Next, data scheduling requirements of data sent by each application to the first access node are then determined (operation 610). For example, it can be determined by coordination node 514 that data sent by each application to the first access node is associated with a scheduling priority indicator, such as guaranteed bit rate (GBR), non-guaranteed bit rate (nGBR), and the like. Based on the traffic class indicator, the data may be given a greater or lesser scheduling priority from access node 506 and/or access node 508. The determined scheduling requirements may be used to estimate a first data rate and a second data rate.

Then, in operation 612, a first loading of the communication link between each wireless device and the first access node and a second loading of a second communication link between each wireless device and the second access node can be determined. The first loading and the second loading can comprise, for example, a utilization or requested utilization of communication link resources, an amount of data that is or may be sent to or from the wireless device over each communication link, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. The second loading can be determined of a possible frequency band selected for communication between a wireless device and the second access node. A loading of a communication link between each wireless device and an access node can comprise an average loading (actual or estimated) during a time period, an aggregate loading (actual or estimated) during a time period, a number of times that a loading (actual or estimated) meets a loading threshold during a time period, and so forth. The determined first and second loadings may be used to estimate the first data rate and the second data rate for each of wireless devices 502 and 504.

Next, a third loading of a backhaul communication link of the first access node, and a fourth loading of a backhaul communication link of the second access node, can be determined (operation 614). A loading of a backhaul communication link can comprise an average loading during a time period, an aggregate loading during a time period, a number of times that a loading meets a loading threshold during a time period, and so forth. Examples of the third loading can comprise a loading of communication link 528 between access node 506 and controller node 510, or of communication link 530 between access node 506 and gateway node 512. Examples of the fourth loading can comprise a loading of communication link 532 between access node 508 and controller node 510, or a loading of communication link 534 between access node 508 and gateway node 512. Other loadings of backhaul communication links can also be determined, including combinations of the foregoing. The loadings of the backhaul communication links can be determined in the aggregate, or separate loadings can be determined on the basis of data traffic related to each wireless device. A loading of a backhaul communication link can comprise a utilization or requested utilization of communication link resources, an amount of data that is or may be sent to or from the wireless device over each communication link, a number of physical resource blocks or other wireless communication link resource utilized by the wireless device, a requested amount of data to be sent to or from the wireless device (as may be determined from a buffer status report or similar request for wireless communication link resources), an amount of data buffered for transmission to or from the wireless device, and the like, including combinations thereof. The determined third and fourth loadings may be used to estimate the first data rate and the second data rate for each of wireless devices 502 and 504.

A first data rate for each wireless device is then estimated using a first communication scheme between each wireless device and the first and second access nodes based on the respective first and second signal levels for each wireless device (operation 616). For example, based on the signal level measurements of first and second communication links 518 and 522, an estimation can be made of a first data rate for wireless device 502 which may be achieved using the first communication scheme. Similarly, for wireless device 502, an estimation can be made of a first data rate for which may be achieved using the first communication scheme based on the signal level measurements of first and second communication links 520 and 524. The first data rate can further be estimated using at least one of the data routing requirements, the data scheduling requirements, the first loading and the second loading, and the third loading and the fourth loading. The first communication scheme can comprise a first method of coordinating communication between a wireless device, access node 506 and access node 508. The first method of coordinating communication can comprise transmitting data from a wireless device to both access node 506 and to access node 508. The data received by access nodes 506 and 508 can be combined and processed to produce a combined output signal comprises the data transmitted from a wireless device. The combined output signal can then be sent from one of access node 506 and access node 508 to gateway node 512 over communication link 530 or 534, respectively, and from gateway node 512 to communication network 516. Combining the data received from access nodes 506 and 508 permits the reduction of errors from data signals that are relatively low in strength, or masked by interference. In operation, data received by one access node is transferred to the other access node (e.g., from access node 506 to access node 508, or vice versa, over communication link 526) for combination into the combined output signal. The transfer of data from the wireless device from one access node to the other access node can increase a load or utilization of communication resources in a backhaul, such as between the first and second access nodes, as well as potentially between the access nodes and other intermediate network elements. An example of the first communication scheme can comprise Joint Reception and Processing according to the Coordinated-Multipoint (CoMP) feature of the LTE-Advanced radio access technology. Other examples are also possible. In an embodiment, the first data rate can further be estimated using the first communication scheme, the data routing requirements, the data scheduling requirements, the first loading and the second loading, and the third loading and the fourth loading.

Then, a second data rate or each wireless device is estimated using a second communication scheme between the wireless device and the first and second access nodes based on the first and second signal levels (operation 618). For example, based on the signal level measurements of first and second communication links 518 and 522, an estimation can be made of a second data rate for wireless device 502 which may be achieved using the second communication scheme. Similarly, based on the signal level measurements of first and second communication links 520 and 524, an estimation can be made of a second data rate for wireless device 504 which may be achieved using the second communication scheme. The second data rate can further be estimated using at least one of the data routing requirements, the data scheduling requirements, the first loading and the second loading, and the third loading and the fourth loading. The second communication scheme can comprise a second method of coordinating communication between a wireless device, access node 506 and access node 508. The second method of coordinating communication can comprise coordinating the scheduling of transmission of data from a wireless device among access nodes 506 and 508 to minimize interference. For example, wireless device 502 (or 504) can be instructed to transmit data first to access node 506, and then to access node 508. Each of access nodes 506 and 508 can then send data which each receives from wireless device 502 (or 504) to gateway node 512 over communication links 530 and 534, respectively, and gateway node 512 can then send the data from wireless device 502 (or 504) to communication network 516. Coordinating the scheduling of data reception by each of access nodes 506 and 508 tends to reduce a load or utilization of communication resources in a backhaul, such as between the first and second access nodes, as well as potentially between the access nodes and other intermediate network elements. However, compared with the first communication scheme, the second communication scheme may provide the data from a wireless device to communication network 516 at a lower data rate. An example of the second communication scheme can comprise Coordinated Scheduling according to the Coordinated-Multipoint (CoMP) feature of the LTE-Advanced radio access technology. Other examples are also possible. In an embodiment, the second data rate can further be estimated using the second communication scheme, the data routing requirements, the data scheduling requirements, the first loading and the second loading, and the third loading and the fourth loading.

Based on the estimated first data rate and the estimated second data rate and the application requirement, one of the first communication scheme and the second communication scheme is selected for use by each wireless device and the first and second access nodes (operation 620). A different communication scheme can be selected for each wireless device. For example, when an application running on wireless device 502 comprises a delay sensitive application, such as a streaming audio application, a streaming video application, a voice application, and the like, the first communication scheme may be selected, to satisfy the relatively high required minimum data rate, or relatively low maximum permitted data delay, or relatively high minimum required throughput, or relatively low maximum permitted error rate, or relatively low maximum permitted data loss rate, and so forth, of the application. Further, when an application running on wireless device 504 comprises a delay insensitive application, such as an email application, a messaging application, a web browsing application, and the like, the second communication scheme may be selected, based on the relatively low required minimum data rate, relatively high maximum permitted data delay, relatively high minimum required throughput, relatively low maximum permitted error rate, relatively low maximum permitted data loss rate, and so forth, of the application.

When the communication scheme is selected for each wireless device, a communication link is established between each wireless device and the second access node (operation 622), and each wireless device, the first access node, and the second access node are instructed to use the selected communication scheme (operation 624). For example, where wireless device 502 is initially in communication with access node 506 over communication link 518, second communication link 522 can be established between wireless device 502 and access node 508. As another example, where wireless device 504 is initially in communication with access node 508 over communication link 524, second communication link 520 can be established between wireless device 504 and access node 506. Establishing the communication link can comprise reserving communication resources of each communication link to each wireless device, allocating one or more frequency bands to each wireless device, and the like. The instruction to use the selected communication scheme can be sent by coordination node 514, controller node 510, or gateway node 512. Similarly, the instruction to use the selected communication scheme can be sent by access node 506 and/or access node 508. In an embodiment, each selected communication scheme is used in an uplink portion of the communication link between each wireless device and the first access node and an uplink portion of the second communication link between the wireless device and the second access node.

In operation 626, it can be determined that at least one condition has changed related to a wireless device. For example, a wireless device may run a different application, changing the application type and/or application requirements of the application running on the wireless device.

Similarly, the data routing requirements or the data scheduling requirements of the data sent by the new application may change. In addition, the loading of one or more of the communication links between a wireless device and one of access nodes 506 and 508 may change. Further, the loading of one or more backhaul communication links may change.

When at least one condition is determined to have changed for a wireless device, a first data rate is re-estimated for the wireless device using the first communication scheme between each wireless device and the first and second access nodes based on the respective first and second signal levels for the wireless device and the changed condition or conditions (operation 628). The first data rate can be re-estimated according to a process such as that described above with respect to operation 616. Then, a second data rate is re-estimated for the wireless device using the second communication scheme between each wireless device and the first and second access nodes based on the respective first and second signal levels for the wireless device and the changed condition or conditions (operation 630). The second data rate can be re-estimated according to a process such as that described above with respect to operation 618.

Based on the re-estimated first data rate and the estimated second data rate and the application requirement, one of the first communication scheme and the second communication scheme is selected for use by each wireless device and the first and second access nodes (operation 632). The new communication scheme can reflect the changed conditions for the wireless device. When the communication scheme is selected for the wireless device, the wireless device, the first access node, and the second access node are instructed to use the new selected communication scheme (operation 634). The instruction to use the new selected communication scheme can be sent by coordination node 514, controller node 510, or gateway node 512. Similarly, the instruction to use the selected communication scheme can be sent by access node 506 and/or access node 508.

Figure 7:
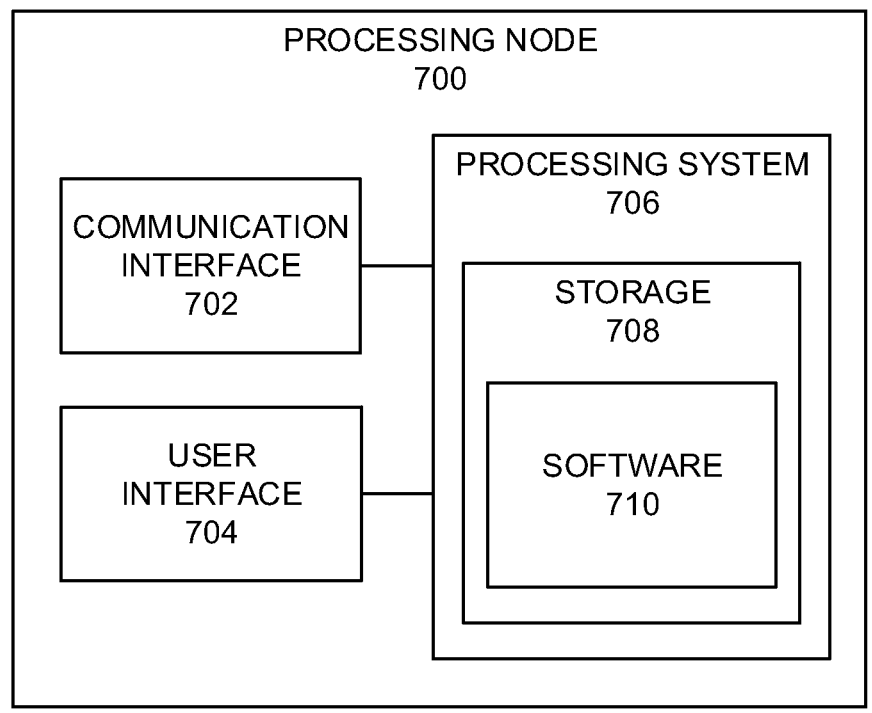
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to coordinate wireless communication with access nodes. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104 and 106, access nodes 304 and 306, access nodes 506 and 508, controller nodes 308 and 510, gateway nodes 310 and 512, and coordination nodes 312 and 514. Processing node 700 can also comprise an adjunct or component of a network element. In addition, processing node 700 can also comprise another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths. The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of coordinating wireless communication with access nodes, comprising:

in response to determining that a throughput over a communication link between a wireless device and a first access node meets a throughput threshold, determining an application requirement of an application running on the wireless device;

receiving measurements of a first signal level of the communication link between the wireless device and the first access node and a second signal level of a signal from a second access node received at the wireless device;

estimating a first data rate using a first communication scheme between the wireless device and the first and second access nodes based on the first and second signal levels, wherein the first communication scheme further comprises sending first data from the wireless device to the first access node, sending second data from the wireless device to the second access node, and processing the first and second data into output data to send to a communication network, and wherein estimating the first data rate is further based on a first loading of a backhaul communication link of the first access node, and a second loading of a backhaul communication link of the second access node;

estimating a second data rate using a second communication scheme between the wireless device and the first and second access nodes based on the first and second signal levels; and comparing the first and second data rates to determine which one of the first communication scheme and the second communication scheme meets the application requirement.

2. The method of claim 1, further comprising:

establishing a second communication link between the wireless device and the second access node; and using the selected communication scheme for communication between the wireless device and the first and second access nodes.

3. The method of claim 2, wherein the selected communication scheme is used in an uplink portion of the communication link between the wireless device and the first access node and an uplink portion of the second communication link between the wireless device and the second access node.

4. The method of claim 1, wherein the second communication scheme further comprises coordinating scheduling between the first access node and the second access node to send first data from the wireless device to the first access node at a first time and to send second data from the wireless device to the second access node at a second time.

5. The method of claim 1, further comprising estimating the first data rate and the second data rate further based on an application type of the application running on the wireless device.

6. The method of claim 1, further comprising estimating the first data rate and the second data rate further based on data routing requirements of data sent by the application to the first access node.

7. The method of claim 1, further comprising estimating the first data rate and the second data rate further based on data scheduling requirements of data sent by the application to the first access node.

8. The method of claim 1, further comprising estimating the first data rate and the second data rate further based on a third loading of the communication link between the wireless device and the first access node and a fourth loading of a second communication link between the wireless device and the second access node.

9. The method of claim 1, further comprising estimating the second data rate further based on the first loading of the backhaul communication link of the first access node, and the second loading of the backhaul communication link of the second access node.

10. The method of claim 1, wherein each of the first and second loading comprises one or more of an average loading during a time period, an aggregate loading during the time period, and a number of times that said first and second loading meets a loading threshold during the time period.

11. A system of coordinating wireless communication with access nodes, comprising:

a processing node configured to in response to determining that a throughput over a communication link between a wireless device and a first access node meets a throughput threshold, determine an application requirement of an application running on the wireless device;

receive measurements of a first signal level of the communication link between the wireless device and the first access node and a second signal level of a signal from a second access node received at the wireless device;

estimate a first data rate using a first communication scheme between the wireless device and the first and second access nodes based on the first and second signal levels, wherein the first communication scheme further comprises sending first data from the wireless device to the first access node, sending second data from the wireless device to the second access node, and processing the first and second data into output data to send to a communication network, and wherein estimating the first data rate is further based on a first loading of a backhaul communication link of the first access node, and a second loading of a backhaul communication link of the second access node;

estimate a second data rate using a second communication scheme between the wireless device and the first and second access nodes based on the first and second signal levels; and compare the first and second data rates to determine which one of the first communication scheme and the second communication scheme meets the application requirement.

12. The system of claim 11, wherein the processing node is further configured to:

establish a second communication link between the wireless device and the second access node; and instruct the use of the selected communication scheme for communication between the wireless device and the first and second access nodes.

13. The system of claim 12, wherein the selected communication scheme is used in an uplink portion of the communication link between the wireless device and the first access node and an uplink portion of the second communication link between the wireless device and the second access node.

14. The system of claim 11, wherein the second communication scheme further comprises coordinating scheduling between the first access node and the second access node to send first data from the wireless device to the first access node at a first time and to send second data from the wireless device to the second access node at a second time.

15. The system of claim 11, wherein the processing node is further configured to estimate the first data rate and the second data rate further based on an application type of the application running on the wireless device.

16. The system of claim 11, wherein the processing node is further configured to estimate the first data rate and the second data rate further based on data routing requirements of data sent by the application to the first access node.

17. The system of claim 11, wherein the processing node is further configured to estimate the first data rate and the second data rate further based on data scheduling requirements of data sent by the application to the first access node.

18. The system of claim 11, wherein the processing node is further configured to estimate the first data rate and the second data rate further based on a first loading of the communication link between the wireless device and the first access node and a second loading of a second communication link between the wireless device and the second access node.

19. The system of claim 11, wherein the processing node is further configured to estimate the first data rate and the second data rate further based on a third loading of a backhaul communication link of the first access node, and a fourth loading of a backhaul communication link of the second access node.

20. The system of claim 11, wherein each of the first and second loading comprises one or more of an average loading during a time period, an aggregate loading during the time period, and a number of times that said first and second loading meets a loading threshold during the time period.

* * * * *